US010453615B2

(12) United States Patent
Fukunaga et al.

(10) Patent No.: US 10,453,615 B2
(45) Date of Patent: Oct. 22, 2019

(54) METHOD FOR MANUFACTURING MULTILAYER CERAMIC ELECTRONIC COMPONENT

(71) Applicant: Murata Manufacturing Co., Ltd., Nagaokakyo-shi, Kyoto-fu (JP)

(72) Inventors: Daiki Fukunaga, Nagaokakyo (JP); Masatsugu Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 60 days.

(21) Appl. No.: 15/715,196

(22) Filed: Sep. 26, 2017

(65) Prior Publication Data
US 2018/0096793 A1 Apr. 5, 2018

(30) Foreign Application Priority Data
Sep. 30, 2016 (JP) .................. 2016-193185

(51) Int. Cl.
| | |
|---|---|
| H01G 9/00 | (2006.01) |
| H01G 4/30 | (2006.01) |
| H01G 4/12 | (2006.01) |
| H01G 4/005 | (2006.01) |
| H01G 13/00 | (2013.01) |
| H01G 4/232 | (2006.01) |

(52) U.S. Cl.
CPC .............. *H01G 4/30* (2013.01); *H01G 4/005* (2013.01); *H01G 4/12* (2013.01); *H01G 4/232* (2013.01); *H01G 4/2325* (2013.01); *H01G 13/006* (2013.01)

(58) Field of Classification Search
CPC ...... H01G 4/30; H01G 13/006; H01G 4/2325; H01G 4/232; H01G 4/12; H01G 4/005; Y10T 29/417; Y10T 29/49147

USPC ................................. 29/25.03, 842
See application file for complete search history.

(56) References Cited

U.S. PATENT DOCUMENTS

| | | | | |
|---|---|---|---|---|
| 4,771,520 A | * | 9/1988 | Tanaka | H01G 4/30 29/25.42 |
| 8,795,454 B2 | * | 8/2014 | Matsui | H01G 4/12 156/89.12 |

(Continued)

FOREIGN PATENT DOCUMENTS

| | | |
|---|---|---|
| JP | 6-349669 A | 12/1994 |
| JP | 2005-047059 A | 2/2005 |

(Continued)

OTHER PUBLICATIONS

Official Communication issued in corresponding Korean Patent Application No. 10-2017-0115984, dated Jun. 18, 2018.

*Primary Examiner* — Donghai D Nguyen
(74) *Attorney, Agent, or Firm* — Keating & Bennett, LLP

(57) ABSTRACT

A method for manufacturing a multilayer ceramic electronic component includes preparing a laminate including internal electrodes stacked through a ceramic green sheet, the internal electrodes being exposed on a surface of the laminate, heating a functional sheet while the functional sheet is in contact with a predetermined surface of the laminate, on which the internals electrode are exposed, cooling the heated functional sheet, and forming a covering layer formed of the functional sheet on the predetermined surface of the laminate by punching out the functional sheet having been cooled with the laminate.

19 Claims, 14 Drawing Sheets

(56) References Cited

U.S. PATENT DOCUMENTS

| | | | |
|---|---|---|---|
| 9,633,788 B2 * | 4/2017 | Fukunaga | H01G 4/012 |
| 2012/0234462 A1 | 9/2012 | Matsui et al. | |
| 2015/0340155 A1 | 11/2015 | Fukunaga et al. | |

FOREIGN PATENT DOCUMENTS

| KR | 10-2012-0104949 A | 9/2012 |
|---|---|---|
| KR | 10-2015-0134274 A | 12/2015 |

\* cited by examiner

METHOD FOR MANUFACTURING MULTILAYER CERAMIC ELECTRONIC COMPONENT

CROSS REFERENCE TO RELATED APPLICATIONS

This application claims the benefit of priority to Japanese Patent Application No. 2016-193185 filed on Sep. 30, 2016. The entire contents of this application are hereby incorporated herein by reference.

BACKGROUND OF THE INVENTION

1. Field of the Invention

The present invention relates to a method for manufacturing a multilayer ceramic electronic component.

2. Description of the Related Art

As a method for manufacturing a multilayer ceramic electronic component such as a multilayer ceramic capacitor, there is known a method for manufacturing a multilayer ceramic electronic component including the steps of: preparing a laminate that is laminated with a plurality of internal electrodes and a ceramic green sheet, the internal electrodes being exposed to a side surface of the laminate; sticking a ceramic green sheet on the side surface of the laminate on which the internal electrodes are exposed; and firing the laminate to acquire a fired ceramic laminate.

Japanese Patent Application Laid-Open No. 06-349669 describes a method including the steps of putting a ceramic green sheet serving as a functional sheet on a side surface of a laminate on which an internal electrode is exposed; compressing the ceramic green sheet by using a heating plate; cutting the ceramic green sheet at a corner of the laminate; and bonding the ceramic green sheet on the side surface of the laminate by using thermocompression bonding.

Unfortunately, when a ceramic green sheet is compressed by using a heating plate as the method described in Japanese Patent Application Laid-Open No. 06-349669, the ceramic green sheet is heated to be softened, and then is deformed. This causes a problem in that it is hard to cut the ceramic green sheet on a side surface of a laminate at a corner of the laminate.

SUMMARY OF THE INVENTION

Preferred embodiments of the present invention provide methods for manufacturing multilayer ceramic electronic components, capable of cutting a functional sheet at a corner of a laminate after bringing the functional sheet into contact with a surface on which an internal electrode of the laminate is exposed.

A method for manufacturing a multilayer ceramic electronic component according to a preferred embodiment of the present invention includes the steps of preparing a laminate including a plurality of internal electrodes stacked via a ceramic green sheet, the internal electrode being exposed on a surface of the laminate; heating a functional sheet while the functional sheet is in contact with a predetermined surface of the laminate, on which the internal electrode is exposed; cooling the heated functional sheet; and forming a covering layer formed of the functional sheet on the predetermined surface of the laminate by punching out the functional sheet having been cooled with the laminate.

In the step of heating the functional sheet, the functional sheet may be softened by heating a resin contained in the functional sheet.

The functional sheet may have a structure in which a plurality of sheets each including a thermoplastic resin is stacked, and may be configured such that a softening temperature of a resin contained in a sheet disposed at a position closest to the laminate is the lowest among softening temperatures of resins contained in the respective plurality of sheets defining the functional sheet.

The laminate may be configured such that a softening temperature of a resin contained in the ceramic green sheet including in the laminate is higher than a softening temperature of a resin included in the functional sheet.

The method for manufacturing a multilayer ceramic electronic component may further include the step of bonding the covering layer having been formed on the laminate by using thermocompression bonding.

The functional sheet may be a ceramic green sheet.

A heating temperature in the step of heating the functional sheet may be about 50° C. or more and less than about 100° C., for example.

The laminate may have a structure in which a predetermined internal electrode of the plurality of internal electrodes is extended to one of a pair of end surfaces facing each other, and another predetermined internal electrode of the plurality of internal electrodes is extended to the other of the end surfaces, and in which the plurality of internal electrodes is exposed to both of a first side surface and a second side surface, facing each other, and in the step of heating the functional sheet, the predetermined surface of the laminate, with which the functional sheet is brought into contact, may be the first side surface and the second side surface.

According to preferred embodiments of the present invention, the functional sheet brought into contact with the laminate is heated and bonded to the laminate by using thermocompression bonding, and then the functional sheet is cooled and punched out. As a result, the functional sheet is prevented from being punched out while being deformed by heating, so that the functional sheet is able to be cut at a corner of the laminate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below to more specifically describe features of the present invention. In the description below, a multilayer ceramic capacitor will be described as a multilayer ceramic electronic component, for example.

Figure 1:
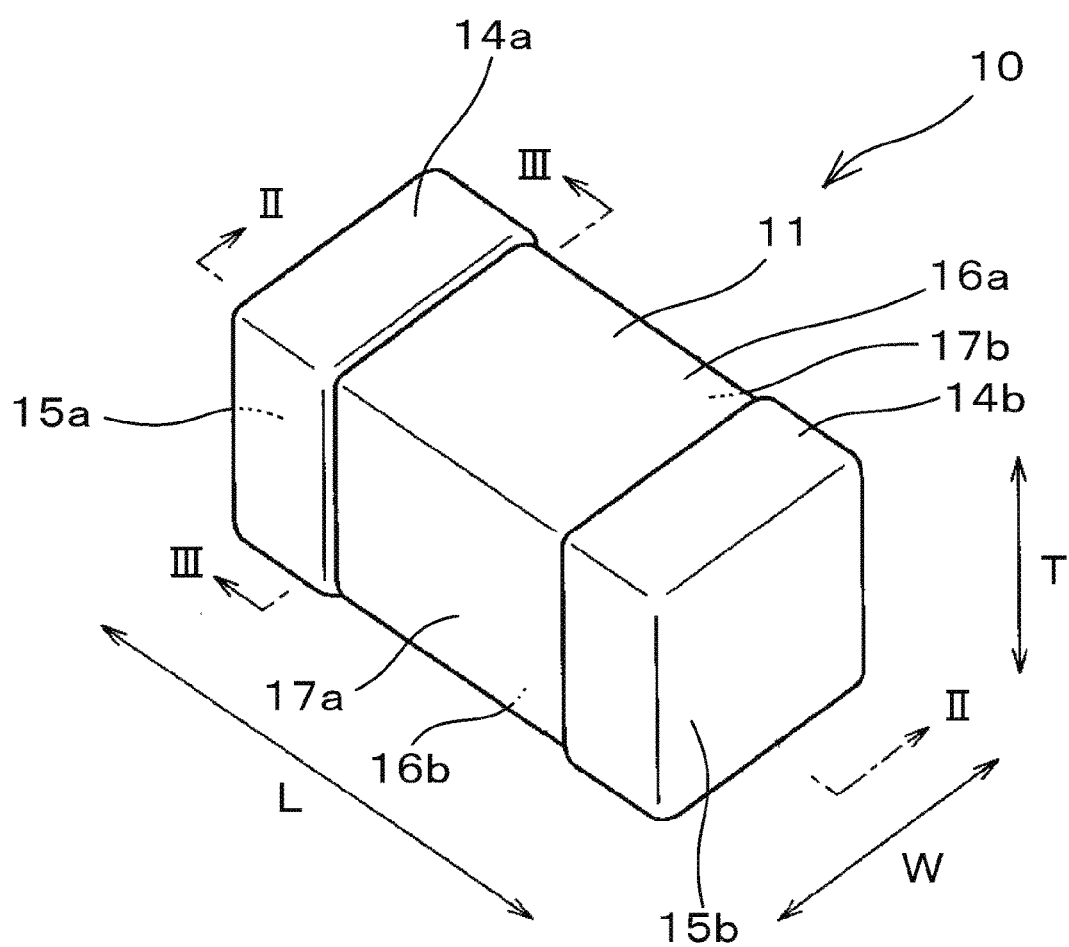
FIG. 1 is a perspective view of a multilayer ceramic capacitor according to a preferred embodiment of the present invention.
Figure 2:
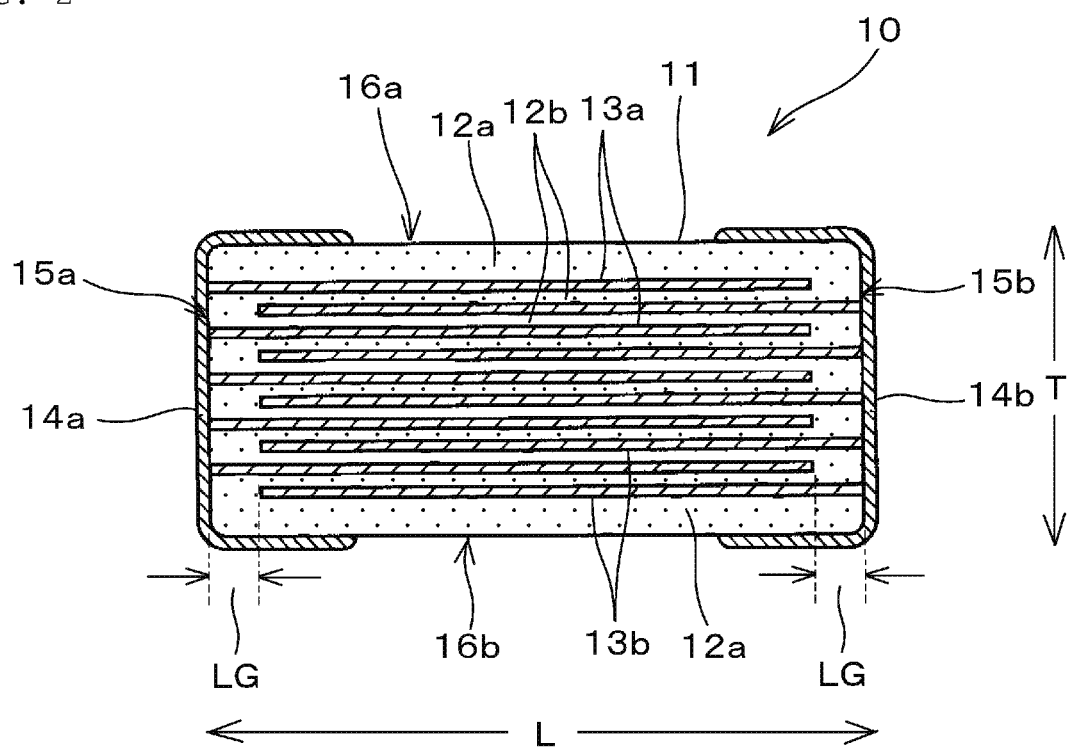
FIG. 2 is a sectional view of the multilayer ceramic capacitor illustrated in FIG. 1, taken along line II-II

FIG. 1 is a perspective view of a multilayer ceramic capacitor 10 according to a preferred embodiment of the present invention. FIG. 2 is a sectional view of the multilayer ceramic capacitor 10 illustrated in FIG. 1, taken along line II-II. FIG. is a sectional view of the multilayer ceramic capacitor 10 illustrated in FIG. 1, taken along line III-III.

Figure 3:
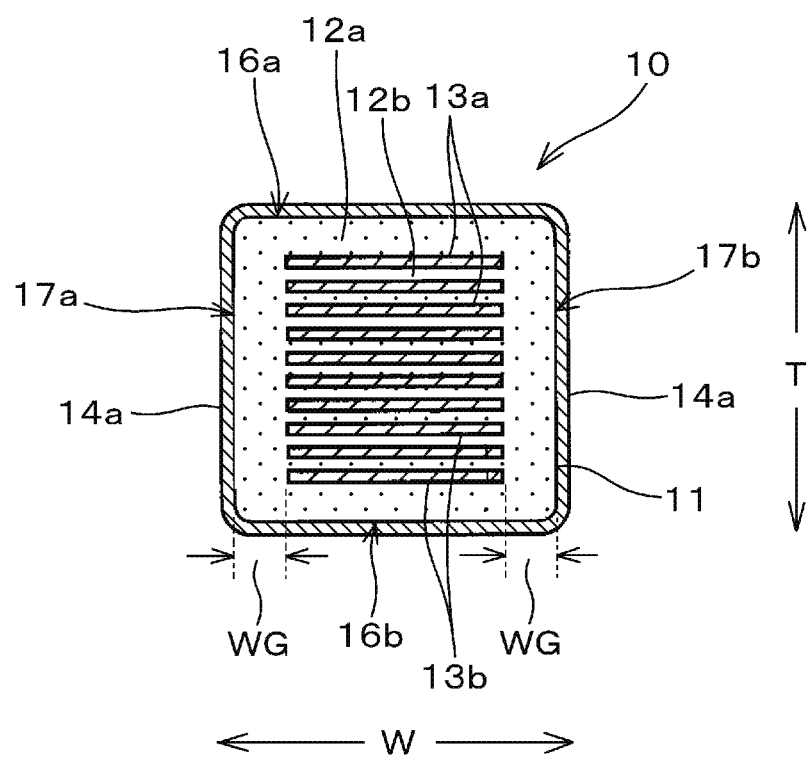
FIG. 3 is a sectional view of the multilayer ceramic capacitor illustrated in FIG. 1, taken along line III-III.

As illustrated in FIGS. 1 to 3, the multilayer ceramic capacitor 10 is an electronic component preferably with a rectangular or substantially rectangular parallelepiped shape, and includes a ceramic laminate 11 having been fired, and a pair of external electrodes 14 (14a and 14b). The pair of external electrodes 14 (14a and 14b) is disposed so as to face a first end surface 15a and a second end surface 15b of the ceramic laminate 11, respectively, as described below.

As illustrated in FIGS. 2 and 3, the ceramic laminate 11 includes a plurality of dielectric layers 12 (12a and 12b), a plurality of first internal electrodes 13a extended to the first end surface 15a of the ceramic laminate 11, and a plurality of second internal electrodes 13b extended to the second end surface 15b, as described below. That is, the plurality of first internal electrodes 13a and the plurality of second internal electrodes 13b are alternately stacked through the respective dielectric layers 12 to define the ceramic laminate 11.

A direction in which the pair of external electrodes 14 surface each other is a lengthwise direction of the multilayer ceramic capacitor 10, a stacked direction of the dielectric layers of the internal electrodes 13 (13a and 13b) is a thickness direction, and a direction orthogonal to each of the lengthwise direction and the thickness direction is a width direction.

The ceramic laminate 11 includes the first end surface 15a and the second end surface 15b, facing each other in the lengthwise direction, a first principal surface 16a and a second principal surface 16b, facing each other in the thickness direction, a first side surface 17a and a second side surface 17b, facing each other in the width direction. The first end surface 15a is provided with the external electrode 14a, and the second end surface 15b is provided with the external electrode 14b.

It is preferable that the ceramic laminate 11 includes rounded corners and rounded ridge line portions. Each of the corners is a portion at which three surfaces of the ceramic laminate 11 intersect with each other, and each of the ridge line portions is a portion at which two surfaces of the ceramic laminate 11 intersect with each other.

It is preferable that the ceramic laminate 11 has a dimension not less than about 0.2 mm and not more than about 20 mm in the lengthwise direction, a dimension not less than about 0.1 mm and not more than about 10 mm in the width direction, and a dimension not less than about 0.1 mm and not more than about 10 mm in the thickness direction, for example. The dimensions of the ceramic laminate 11 can be measured with an optical microscope, for example.

As illustrated in FIGS. 2 and 3, the dielectric layers 12 include outer dielectric layers 12a and inner dielectric layers 12b. The outer dielectric layers 12a are positioned on a first principal surface 16a side and a second principal surface 16b side of the ceramic laminate 11, or are positioned on both respective sides of the ceramic laminate 11 in the thickness direction. More specifically, each of the outer dielectric layers 12a is positioned on a portion between the first principal surface 16a and the first internal electrode 13a closest to the first principal surface 16a, and a portion between the second principal surface 16b and the second internal electrode 13b closest to the second principal surface 16b.

The inner dielectric layers 12b are located between the respective first internal electrodes 13a and the second internal electrodes 13b.

It is preferable that the number of dielectric layers 12 is not less than 5 and not more than 1500, for example. The number of dielectric layers 12 includes the number of outer dielectric layers 12a.

It is preferable that a thickness of the inner dielectric layer 12b in the dielectric layers 12 is not less than about 0.1 μm and not more than about 5.0 μm, for example, and is more particularly is not more than about 0.7 μm, for example. In addition, it is preferable that a thickness of the outer dielectric layer 12a is not less than about 10 μm and not more than about 100 μm, for example.

As described above, the ceramic laminate 11 includes the first internal electrodes 13a extended to the first end surface 15a, and the second internal electrodes 13b extended to the second end surface 15b.

The first internal electrodes 13a and the second electrode 13b are alternately disposed in the thickness direction through the respective inner dielectric layers 12b.

The first internal electrode 13a includes a counter electrode portion facing the second internal electrode 13b, and an extended electrode portion formed by extending the first internal electrode 13a to the first end surface 15a of the ceramic laminate from the counter electrode portion. The second internal electrode 13b includes a counter electrode portion facing the first internal electrode 13a, and an extended electrode portion formed by extending the second internal electrode 13b to the second end surface 15b of the ceramic laminate 11 from the counter electrode portion. When the counter electrode portion of the first internal electrode 13a is opposite to the counter electrode portion of the second internal electrode 13b through the inner dielectric layer 12b, capacitance is generated, and counter electrode portions define and function as capacitor electrodes.

The first internal electrode 13a and the second internal electrode 13b each include at least one of metal such as Ni, Cu, Ag, Pd, and Au, an alloy of Ag and Pd, and the like, for example. The first internal electrode 13a and the second internal electrode 13b may include grains of a dielectric with the same composition base as that of the ceramic contained in the dielectric layer 11.

It is preferable that the number of internal electrodes including the first internal electrode 13a and the second internal electrode 13b is not less than 5 and not more than 1500, for example.

In addition, it is preferable that a thickness of each of the first internal electrode 13a and the second internal electrode 13b is not less than about 0.2 μm and not more than about 5.0 μm, for example.

It is preferable that a dimension in the width direction of each of traverse gaps WG (refer to FIG. 3), which are regions from the ends of the first and second internal electrodes 13a and 13b in the width direction to the first and second side surfaces 17a and 17b of the ceramic laminate 11, is not less than about 5 μm and not more than about 30 μm, for example.

In the present preferred embodiment, each of the traverse gaps WG of the ceramic laminate 11 preferably is formed by using a functional sheet described below.

It is preferable that a dimension in the lengthwise direction of each of longitudinal gaps LG (refer to FIG. 2), which are regions from the leading ends on opposite sides to the extended electrode portions of the first and second internal electrodes 13a and 13b to the first and second end surfaces 15a and 15b of the ceramic laminate 11, is not less than about 10 μm and not more than about 100 μm, for example.

The external electrode 14a preferably is not only formed on all of the first end surface 15a of the ceramic laminate 11, but also formed so as to extend to the first principal surface 16a, the second principal surface 16b, the first side surface 17a, and the second side surface 17b from the first end surface 15a. The external electrode 14b preferably is not only formed on all of the second end surface 15b of the ceramic laminate 11, but also formed so as to extend to the first principal surface 16a, the second principal surface 16b, the first side surface 17a, and the second side surface 17b from the second end surface 15b.

The one external electrode 14a is electrically connected to the first internal electrode 13a, and the other external electrode 14b is electrically connected to the second internal electrode 13b.

The external electrodes 14 (14a and 14b) each include a base electrode layer, and a plating layer disposed on the base electrode layer, for example.

The base electrode layer can include at least one of a baked electrode layer, a resin electrode layer, and a thin film electrode layer, such as described below.

The baked electrode layer contains glass and metal, and may be a single layer or multiple layers. The baked electrode layer contains metal that includes at least one of metal such as Ni, Cu, Ag, Pd, and Au, an alloy of Ag and Pd, and the like, for example.

It is preferable that a thickness of the baked electrode layer, more specifically a thickness of the thickest portion thereof, is not less than about 5 μm and not more than about 100 μm, for example.

The baked electrode layer is formed by applying a conductive paste including glass and metal to the laminate and baking the conductive paste. The baking may be simultaneously performed with firing of the ceramic laminate 11, or may be performed after firing of the ceramic laminate 11.

The resin electrode layer contains conductive grains and a thermosetting resin. When the resin electrode layer is formed, the resin electrode layer may be directly formed on the laminate without forming the baked electrode layer described above. The resin electrode layer may be a single layer or multiple layers.

It is preferable that a thickness of the resin electrode layer, more specifically a thickness of the thickest portion thereof, is not less than about 5 μm and not more than about 100 μm, for example.

The thin film electrode layer is a layer of about 1 μm or less in thickness, in which metal grains are deposited, and is formed by a well-known thin film forming method, such as a sputtering method and an evaporation method, for example.

The plating layer disposed on the base electrode layer contains at least one of metal such as Cu, Ni, Ag, Pd, and Au, an alloy of Ag and Pd, and the like, for example. The plating layer may be a single layer or multiple layers.

It is preferable that the plating layer is a two-layer structure of an Ni-plating layer and an Sn-plating layer, for example.

The Ni plating layer prevents the base electrode layer from being eroded by solder used when the multilayer ceramic capacitor 10 is mounted. The Sn-plating layer enhances solder wettability when the multilayer ceramic capacitor 10 is mounted.

It is preferable that a thickness of the plating layer per layer is not less than about 1 μm and not more than about 10 μm, for example.

A thickness of each of the plurality of inner dielectric layers 12b, as well as a thickness of each of the plurality of internal electrodes 13 (13a and 13b), can be measured by the following method. While a method for measuring a thickness of the inner dielectric layer 12b will be described below, the same applies to a method of measuring a thickness of the internal electrode 13.

First, the ceramic laminate 11 is ground to expose a section defined by the thickness direction and the width direction of the ceramic laminate 11, and then the exposed section is observed with a scanning electron microscope.

In the exposed section, a thickness of the inner dielectric layer 12b is measured on respective five lines of a total of a center line passing through the center of the ceramic laminate 11 in the width direction, along the thickness direction, and two lines extended on each side across the center line at equal intervals. Then, an average value of the five measurement values is indicated as a thickness of the inner dielectric layer 12b.

To acquire a more accurate value, the ceramic laminate 11 is divided into an upper portion, a central portion, and a lower portion, in the thickness direction, and the five measurement values described above are acquired in each of the upper portion, the central portion, and the lower portion. Then, an average value of all of the measurement values acquired is indicated as a thickness of the inner dielectric layer 12b.

Figure 4:
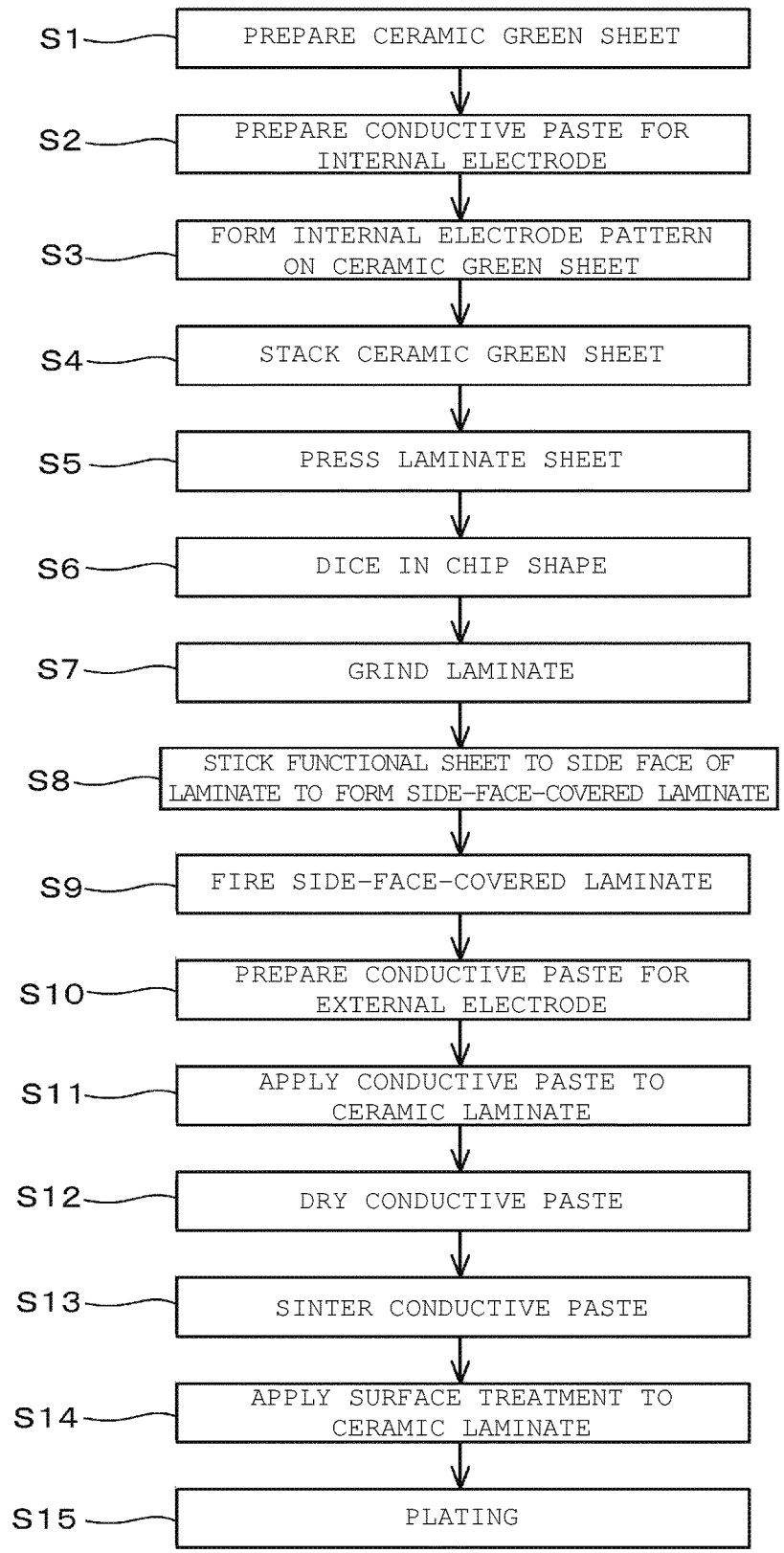
FIG. 4 is a flowchart to describe a method for manufacturing a multilayer ceramic capacitor according to a preferred embodiment of the present invention.

FIG. 4 is a flowchart to describe a non-limiting example of a method for manufacturing a multilayer ceramic capacitor 10 according to a preferred embodiment of the present invention.

First, a mother ceramic green sheet for a dielectric layer is prepared (step S1). The dielectric layer is formed of barium-titanate-based ceramic including a perovskite compound including Ba, Ti, and Ca, and other sub-components, for example. The perovskite compound is expressed by the chemical formula $A_mBO_3$. The A site is Ba, and may contain at least one kind selected from a group consisting of Sr and Ca, along with Ba. The B site is Ti, and may contain at least one kind selected from a group consisting of Zr and Hf, along with Ti. The O represents oxygen, and the m represents a mole ratio of between the A site and the B site.

The mother ceramic green sheet is formed by applying ceramic slurry acquired by combining a binder and a solvent with a dielectric ceramic powder composed of mainly $BaTiO_3$ while dispersing the binder and the solvent to a polyethylene terephthalate (PET) film and drying the ceramic slurry, for example. It is preferable that the ceramic slurry is applied so as to have a thickness not less than about 0.2 μm and not more than about 10 μm, for example, and can be applied by using various methods such as die coater and screen printing.

Subsequently, a conductive paste for internal electrodes is prepared (step S2). The conductive paste for internal electrodes contains an Ni-powder, a solvent, a disperser, a binder, and the like, and is adjusted so as to have a uniform viscosity.

Subsequently, the mother ceramic green sheet is printed with the conductive paste for internal electrodes by screen printing or gravure printing, for example, to form an internal electrode pattern in the shape of an elongated strip (step S3).

Only one internal electrode pattern in the shape of an elongated strip may be formed, or a plurality of internal electrode patterns may be formed at predetermined intervals. It is preferable that a thickness of the internal electrode pattern is not less than about 0.2 μm and not more than about 10 μm, for example.

When the mother ceramic green sheet is in the shape of an elongated strip, the internal electrode pattern can be formed such that its longitudinal direction is along a lengthwise direction of the mother ceramic green sheet in the shape of an elongated strip.

Figure 5:
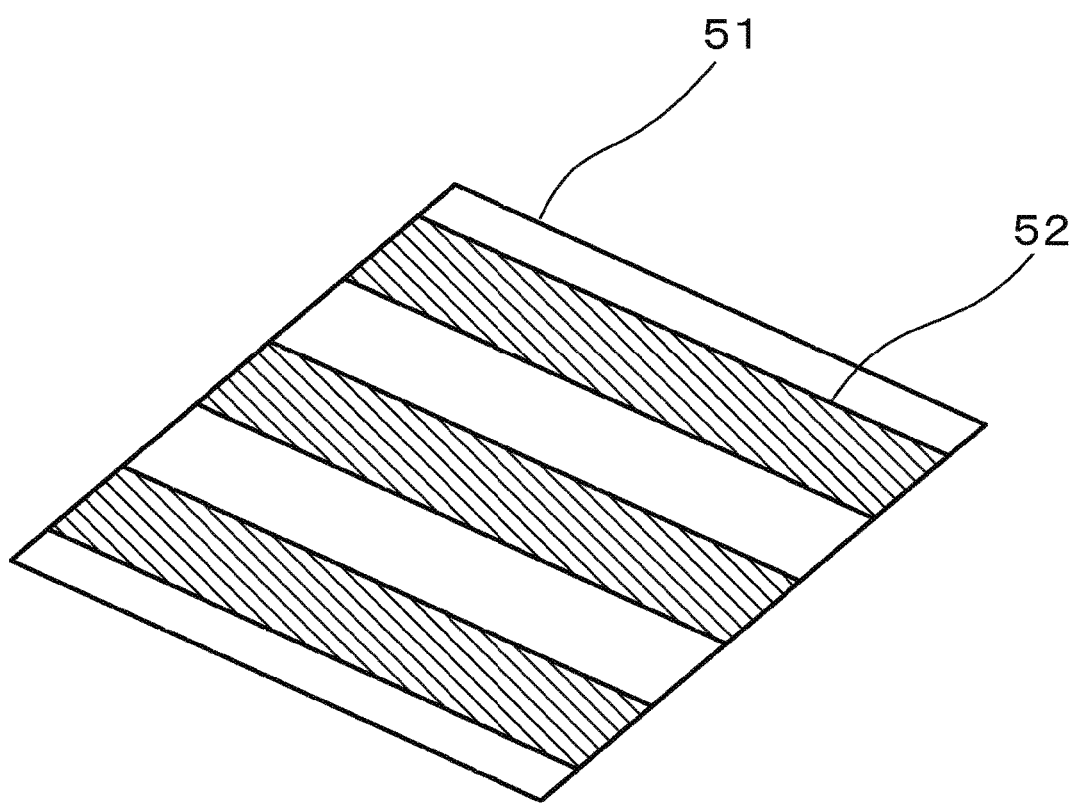
FIG. 5 illustrates a ceramic green sheet in a non-elongated strip shape, including an internal electrode pattern in an elongated strip shape.

When the mother ceramic green sheet is in the shape of a square, an internal electrode pattern can be formed so as to extend from one end of a mother ceramic green sheet 51 to the other end thereof as illustrated in FIG. 5, for example.

After that, a predetermined number of outer layer ceramic green sheets, on which no internal electrode pattern is formed, is stacked so as to have a thickness not less than about 0.5 μm and not more than about 5 μm, for example. Then, inner layer ceramic green sheets, on each of which an internal electrode pattern is printed, are sequentially stacked on the outer layer ceramic green sheets, and then a predetermined number of the outer layer ceramic green sheets is stacked on the inner layer ceramic green sheets so as to have a thickness not less than about 5 μm and not more than about 100 μm, for example, thereby forming a laminate sheet (step S4).

Figure 6:
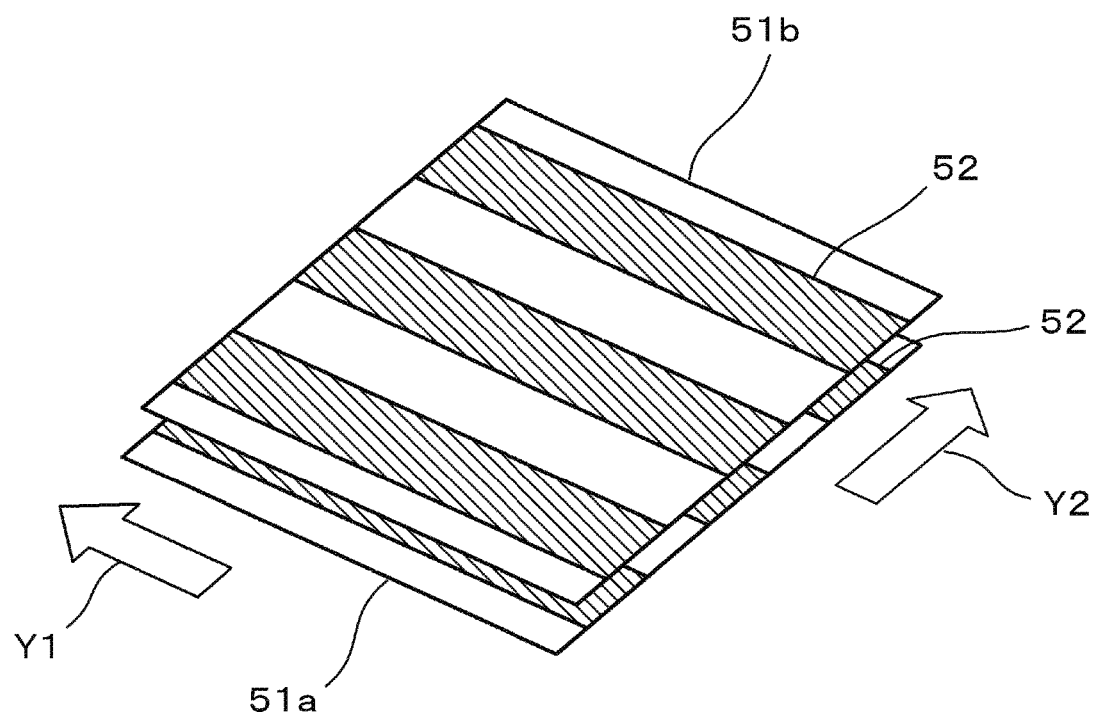
FIG. 6 is an illustration to describe a method for stacking inner layer ceramic green sheets.

A method for stacking inner layer ceramic green sheets will be described in detail. In a plurality of inner layer ceramic green sheets to be stacked, an even-numbered inner layer ceramic green sheet 51b is stacked while being displaced in a direction of an arrow Y2 by a predetermined distance with respect to an odd-numbered inner layer ceramic green sheet 51a, as illustrated in FIG. 6. The direction of the arrow Y2 is a direction in which an internal electrode pattern 52 extends, or a direction orthogonal to a direction of an arrow Y1.

The number of inner layer ceramic green sheets 51 to be stacked is not less than 5 and not more than 1500, for example. When a plurality of inner layer ceramic green sheets 51 are stacked, odd-numbered inner layer ceramic green sheets 51a are not mutually displaced in a width direction of the internal electrode pattern 52, as well as even-numbered inner layer ceramic green sheets 51b are not mutually displaced in the width direction of the internal electrode pattern 52.

Subsequently, a laminate sheet formed by the method described above is pressed in a lamination direction by a rigid press or an isostatic press, and then stacked ceramic green sheets are bonded to each other by pressure bonding to form a laminate block (step S5). At this time, when pressed at a predetermined temperature, the ceramic green sheets closely adhere to each other.

When a resin sheet with a predetermined thickness is disposed in an outermost layer and is pressed, pressure is applied to a portion without an internal electrode pattern to enable mutual adhesive strength of ceramic green sheets to be increased.

Then, the formed laminate block is diced into chip shapes by various methods such as dicing, and pressing and cutting (step S6). This enables a laminate 70 illustrated in FIG. 7A to be acquired. When functional sheets 100 (100a and 100b) are respectively provided on one side surface 71a and the other side surface 71b, being a pair of side surfaces the laminate 70, as described below, and fired, the ceramic laminate 11 in the multilayer ceramic capacitor 10 illustrated in FIG. 1 is formed.

Figure 7A:
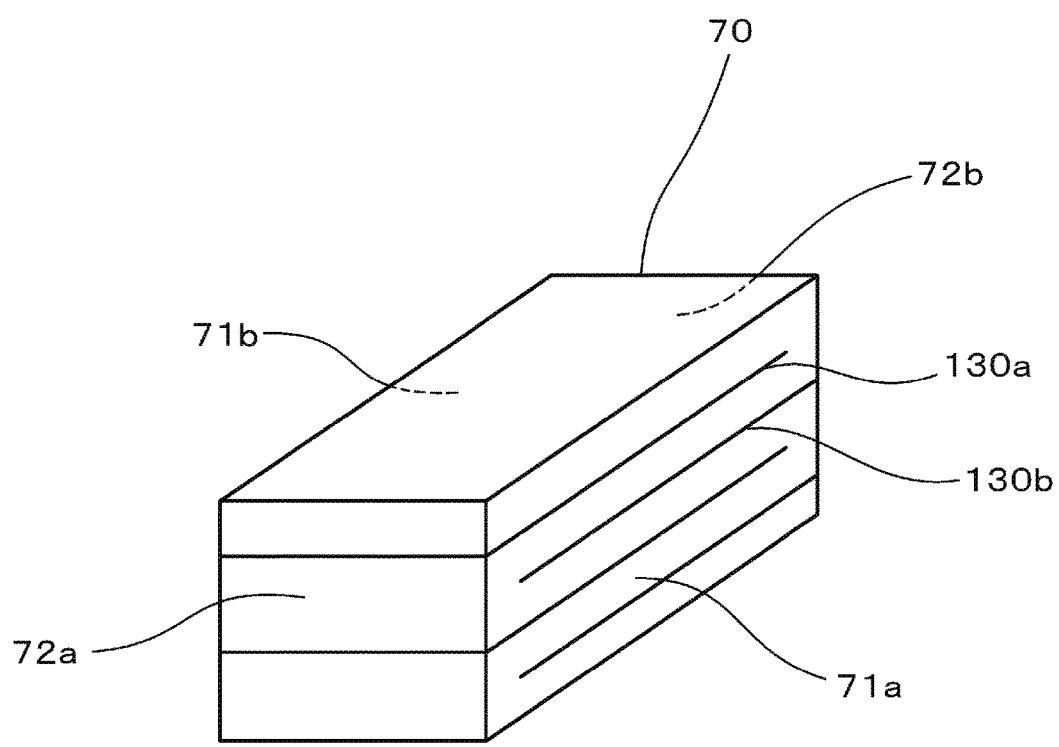
FIG. 7A illustrates a diced laminate.

When a dicing method is more specifically described, as illustrated in FIG. 7A, the laminate block is diced such that an electrode pattern 130a to be the first internal electrode 13a (hereinafter referred to as simply an "internal electrode 130a" for easy understanding) is exposed to the one side surface 71a of side surfaces of the laminate 70 being a diced laminate chip, the side surfaces facing each other, and an electrode pattern 130b to be the second internal electrode 13b (hereinafter referred to as simply an "internal electrode 130b") is exposed to the other side surface 71b thereof, and such that the internal electrode 130a is exposed to one end surface 72a of a pair of end surfaces of the laminate 70, the end surfaces facing each other, and the internal electrode 130b is exposed to the other end surface 72b thereof.

The laminate block may be cut only in the direction indicted by the arrow Y1 of FIG. 6 to form a rod-shaped chip, and then the rod-shaped chip may be cut in the direction of the arrow Y2 to be diced in the subsequent step.

While FIG. 7A illustrates a structure in which the laminate 70 includes the internal electrodes 130a and 130b two by two, the laminate 70 actually includes more internal electrodes.

After that, corners and ridge line portions of the laminate 70 are rounded by barrel finishing or the like (step S7).

Figure 7B:
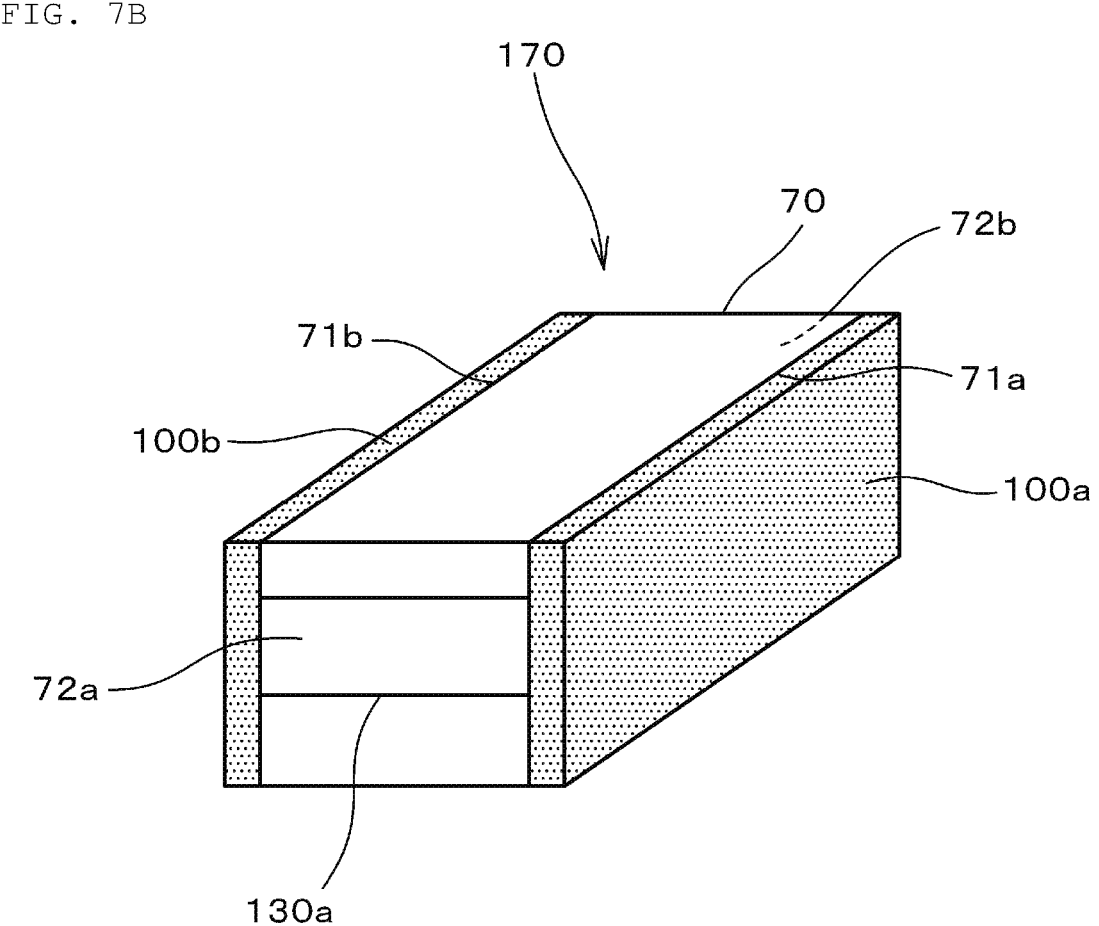
FIG. 7B illustrates a side-surface-covered laminate acquired by forming a covering layer on a side surface of a diced laminate.
Figure 8:
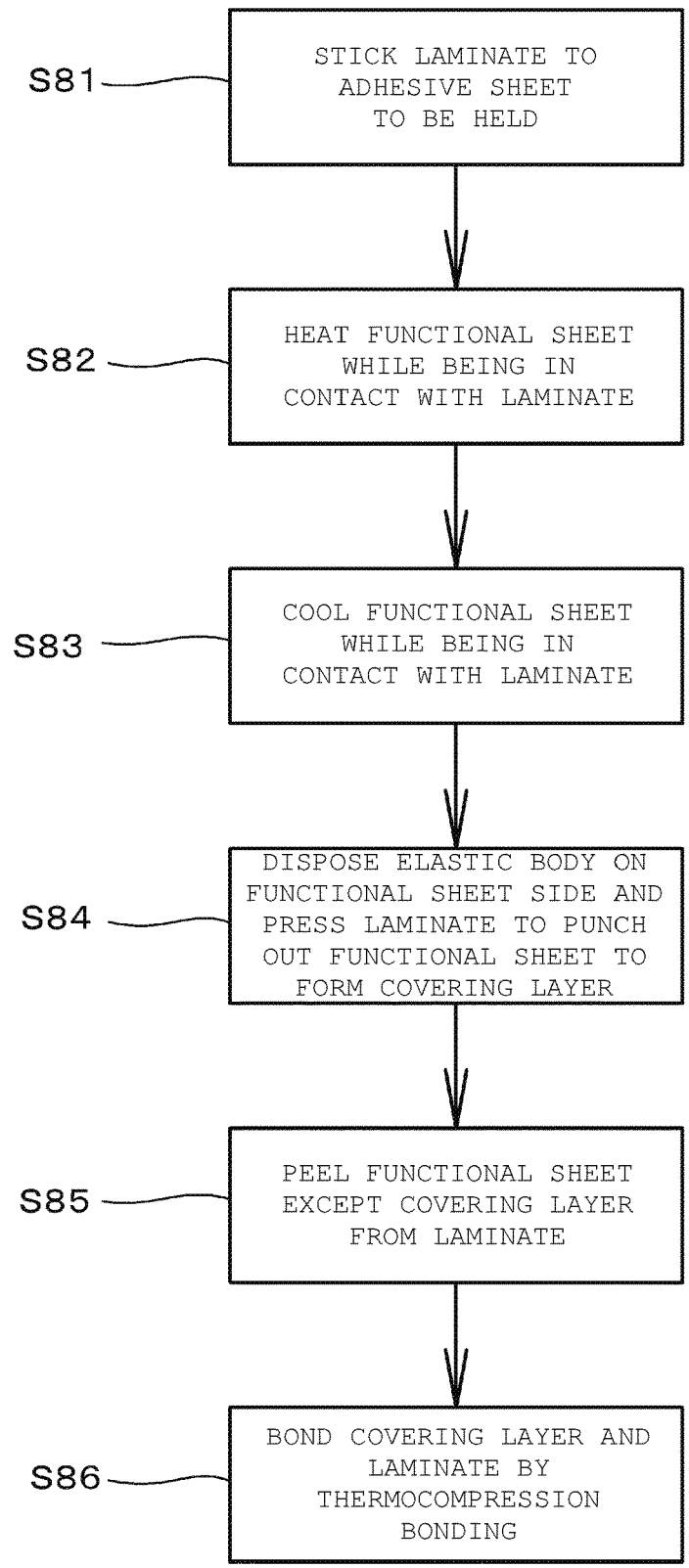
FIG. 8 is a flowchart showing a detailed procedure for forming a side-surface-covered laminate by sticking a functional sheet on a side surface of a laminate.

Subsequently, as illustrated in FIG. 7B, the functional sheets 100 (100a and 100b) described below are respectively stuck on the side surfaces 71a and 71b of the laminate 70 to form a side-surface-covered laminate 170, in which the one side surface 71a of the pair of side surfaces facing each other is covered with the functional sheet 100a, and the other side surface 71b is covered with the functional sheet 100b (step S8). A detailed method for forming the side-surface-covered laminate 170 will be described with reference to the flowchart illustrated in FIG. 8 and FIGS. 9 to 13.

Figure 9:
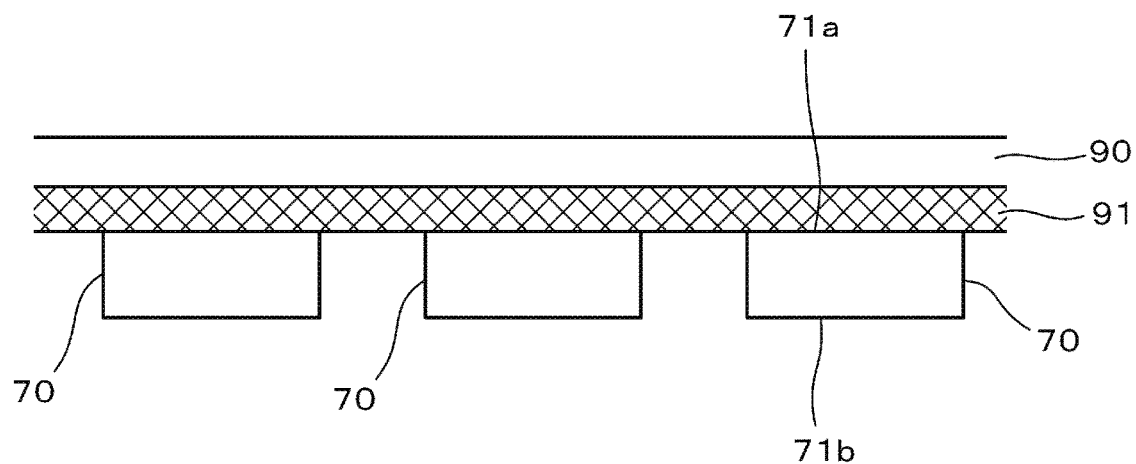
FIG. 9 illustrates a state where one of side surfaces of a laminate is stuck to an adhesive sheet.

First, as illustrated in FIG. 9, the one side surface 71a of the laminate 70 is stuck to an adhesive sheet 91 stuck to a base plate 90 to hold the laminate 70 with the adhesive sheet 91 (step S81). One laminate 70 may be stuck to the adhesive sheet 91, or a plurality of the laminates 70 may be stuck thereto as shown in FIG. 9. It is preferable that the adhesive sheet 91 can be adjusted for adhesive strength like a foaming release sheet, for example.

Figure 10:
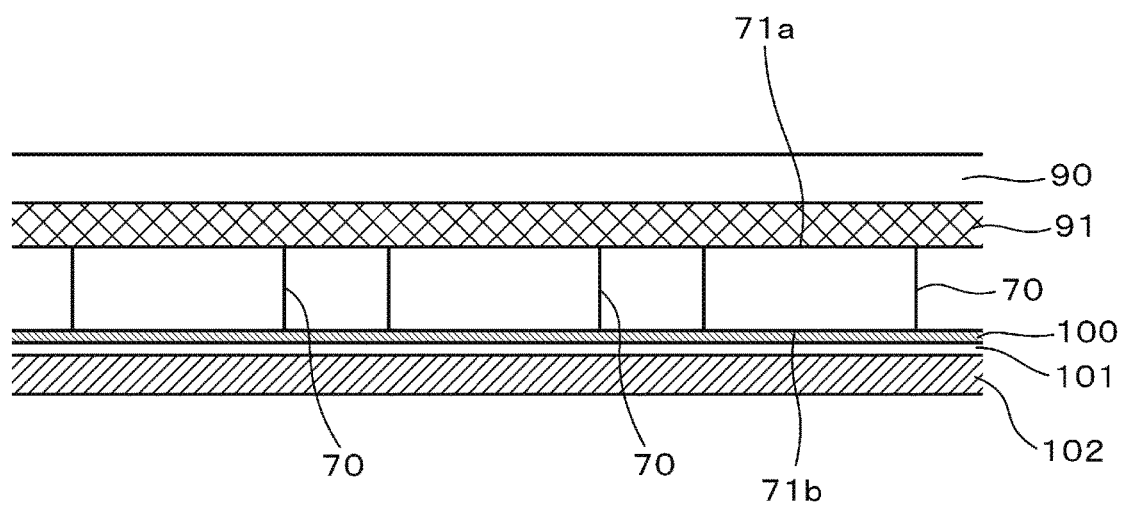
FIG. 10 illustrates a state where a functional sheet brought into contact with a laminate is heated by using a heating plate.

Subsequently, the functional sheet 100 is brought into contact with the side surface 71b of the laminate 70, to which internal electrodes 130a and 130b are exposed, and then the functional sheet 100 is heated while being in contact with the side surface 71b (step S82). The functional sheet 100 is heated by using a heating plate 102 as illustrated in FIG. 10, for example.

The functional sheet 100 is used to form the traverse gap WG of the ceramic laminate 11, described above. The functional sheet 100 is a ceramic green sheet including mainly $BaTiO_3$, for example, and defines and functions as a dielectric layer, or an insulator layer after being fired.

The functional sheet 100 contains a thermoplastic resin, and more specifically a thermoplastic resin binder. The resin binder contained in the functional sheet 100 has a softening temperature lower than a heating temperature when the functional sheet 100 is heated by the heating plate 102. This causes the resin binder contained in the functional sheet 100 to be softened when the functional sheet 100 is heated, so that the functional sheet 100 adheres to the side surface of the laminate 70.

The functional sheet 100 is used with a size larger than the side surface 71b of the laminate 70, to which the internal electrodes 130a and 130b are exposed. As illustrated in FIG. 10, it is preferable to use the functional sheet 100 lined with a PET film 101.

The functional sheet 100 formed by stacking a plurality of the ceramic green sheets can be used. In this case, each of the plurality of the ceramic green sheets may have the same composition or may be different in composition. In the present preferred embodiment, the functional sheet 100 is described based on the premise that it has a structure in which a plurality of ceramic green sheets is stacked.

It is preferable that a softening temperature of a resin binder contained in a ceramic green sheet disposed at a position closest to the laminate 70 is the lowest among softening temperatures of the resin binder contained in the plurality of ceramic green sheets defining the functional sheet 100 to increase adhesive strength between the laminate 70 and the functional sheet 100.

A resin binder contained in a ceramic green sheet disposed at a position farthest away from the laminate 70 among the plurality of ceramic green sheets defining the functional sheet 100 can use polyvinyl butyral (PVB) with a glass transition temperature lower than that of each of resin binders contained in other respective ceramic green sheets defining the functional sheet 100.

It is preferable that a ceramic green sheet disposed at a position farthest away from the laminate 70 among the plurality of ceramic green sheets defining the functional sheet 100 has a thickness larger than that of each of other ceramic green sheets defining the functional sheet 100. A ceramic green sheet disposed at an outermost position is exposed to outside air when being formed as the multilayer ceramic capacitor 10, so that a thicker outer ceramic green sheet effectively prevents moisture entry from the outside.

When the laminate 70 is deformed due to heating by the heating plate 102, the internal electrodes 130a and 130b in the laminate 70 may warp near the side surface of the laminate 70 to cause a short-circuit. Thus, it is preferable that a resin binder contained in each of the ceramic green sheets defining the laminate 70 has a softening temperature higher than a heating temperature when the functional sheet 100 is heated by the heating plate 102.

As described above, the resin binder contained in each of the ceramic green sheets defining the functional sheet 100 has a softening temperature lower than a heating temperature when the functional sheet 100 is heated by the heating plate 102. Thus, in consideration of a relationship among a softening temperature of a resin binder contained in each of the ceramic green sheets defining the laminate 70, a heating temperature by the heating plate 102, and a softening temperature of a resin binder contained in each of the ceramic green sheets defining the functional sheet 100, it is preferable that a softening temperature of a resin binder contained in each of the ceramic green sheets defining the laminate 70 is higher than a softening temperature of a resin binder contained in each of the ceramic green sheets defining the functional sheet 100. When a softening temperature of a resin binder contained in each of the ceramic green sheets defining the laminate 70 is made higher than a softening temperature of a resin binder contained in each of the ceramic green sheets defining the functional sheet 100, a short-circuit of the internal electrodes 130a and 130b in the laminate 70 is able to be prevented at the time of heating with the heating plate 102, as described above.

A heating temperature when the functional sheet 100 is heated with the heating plate 102 preferably is about 50° C. or more and less than about 100° C., for example. That is because if a heating temperature is less than about 50° C., the functional sheet 100 may not be stuck to a side surface of the laminate 70, and if a heating temperature is more than about 100° C., the laminate 70 may be deformed to cause a short-circuit of the internal electrodes 130a and 130b.

Subsequently, the functional sheet 100 in contact with the laminate 70 is cooled (step S83).

A method for cooling the functional sheet 100 is not particularly limited, and thus the functional sheet 100 may be cooled with an air cooling fan or a Peltier element, for example, or may be cooled by self-heat dissipation. The functional sheet 100 is preferably cooled until its temperature becomes about 30° C. or less, and is more preferably cooled until its temperature becomes a normal temperature, for example.

As illustrated in FIG. 10, when the functional sheet 100 is lined with the PET film 101, it is preferable to cool the functional sheet 100 after the PET film 101 is peeled. The description below is based on the premise that the functional sheet 100 is cooled after the PET film 101 is peeled.

Figure 11:
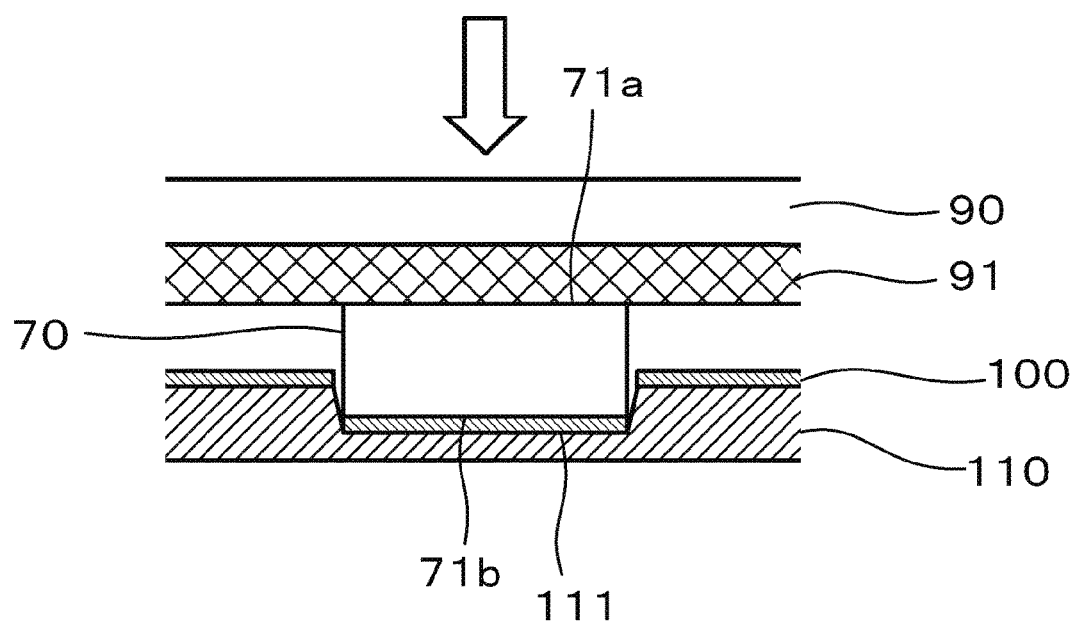
FIG. 11 is an illustration to describe a method for forming a covering layer on a side surface of a laminate by punching out a functional sheet.

Then, as illustrated in FIG. 11, a tabular elastic body 110 is disposed on a surface of the functional sheet 100, opposite to its surface in contact with the laminate 70, and the laminate 70 held on the base plate 90 is pressed to a functional sheet 100 side while the elastic body 110 is fixed to punch out the functional sheet 100 (step S84).

That is, the laminate 70 is pressed to the functional sheet 100 side to cut the functional sheet 100 with corners of the laminate 70, so that the functional sheet 100 is punched out. As a result, a covering layer 111 defined by the functional sheet punched out is formed on the side surface 71b of the laminate 70.

The covering layer 111 forms the traverse gap WG of the ceramic laminate 11 through a firing step described below.

While FIG. 11 illustrates one of the laminates 70 stuck to the adhesive sheet 91 for easy understanding, the laminates 70 stuck to the adhesive sheet 91 are pressed to the functional sheet 100 side to enable the laminates 70 to simultaneously punch out the functional sheet 100.

In the present preferred embodiment, the functional sheet 100 heated is cooled before being punched out. As a result, the functional sheet 100 is prevented from being punched out while being deformed due to heating, so that the functional sheet 100 can be favorably cut with corners of the laminate 70.

To prevent the functional sheet 100 from being deformed due to high temperature when the functional sheet 100 is punched out, it is preferable that the elastic body 110 has a temperature of about 30° C. or less, for example. That is because if the functional sheet 100 is deformed due to high temperature, the functional sheet 100 cannot be punched out with corners of the laminate 70.

Figure 12:
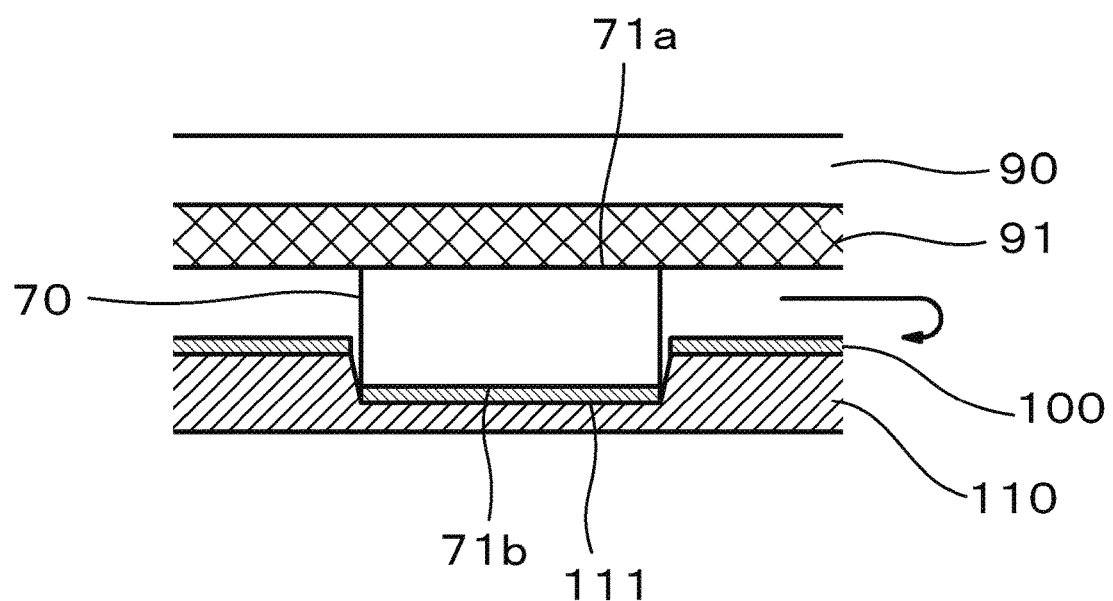
FIG. 12 is an illustration to describe a method for peeling off a functional sheet except a covering layer.

Subsequently, the functional sheet 100 except the covering layer 111 formed on the side surface 71b of the laminate is peeled (step S85). While a peeling method is not particularly limited, it is preferable that the functional sheet 100 is folded back so as to be turned over in a direction parallel or substantially parallel to the side surface of the laminate 70 as illustrated in FIG. 12 because the covering layer 111 is not peeled from the laminate 70.

Then, the laminate 70 and the covering layer 111 are bonded to each other by thermocompression bonding (step S86). This allows the covering layer 111 to be fastened to the laminate 70.

Figure 13:
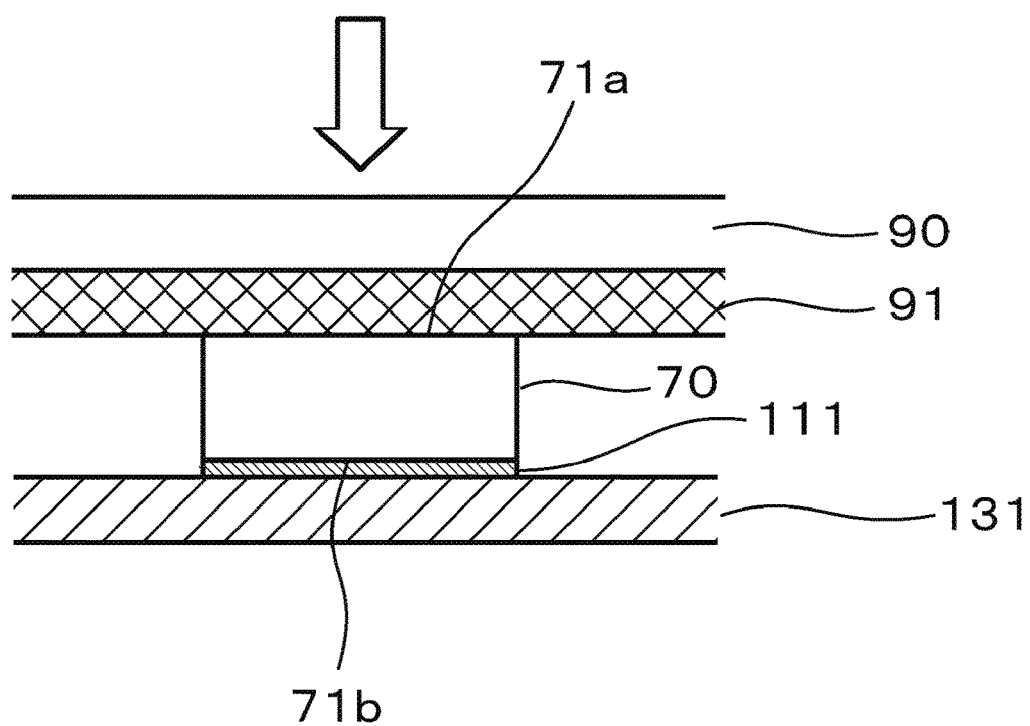
FIG. 13 is an illustration to describe a method for forming a side-surface-covered laminate by bonding a laminate and a covering layer to each other by using thermocompression bonding.

The laminate 70 and the covering layer 111 can be bonded to each other by thermocompression bonding by using a heating plate 131 as illustrated in FIG. 13, for example.

It is preferable that a heating temperature at the time of thermocompression bonding is not less than 50° C. and not more than about 100° C., for example. In addition, it is preferable that a compression force at the time of thermocompression bonding is adjusted such that surface pressure per laminate is not less than about 1 MPa and not more than about 15 MPa, for example. That is because if surface pressure per laminate is less than about 1 MPa, the covering layer 111 is liable to be peeled from the laminate 70, and if the surface pressure per laminate is more than about 15 MPa, the pressure may cause distortion of the laminate 70, or may cause a short-circuit in the internal electrodes 130a and 130b near the side surface of the laminate 70.

If the covering layer 111 is sufficiently fastened to the laminate 70 when the functional sheet 100 is punched out to form the covering layer 111, this thermocompression bonding step (step S86) can be eliminated.

Subsequently, a covering layer is formed on the side surface 71a of the laminate 70 by a similar method. This forms the side-surface-covered laminate 170 (refer to FIG. 7B).

Returning to the flowchart of FIG. 4, the description will be continued.

Subsequently, the side-surface-covered laminate 170, having been formed, is fired to acquire the ceramic laminate 11 having been fired, defining the multilayer ceramic capacitor 10 illustrated in FIG. 1 (step S9).

Then, a conductive paste for external electrodes is prepared (step S10), and the conductive paste for external electrodes is applied to the ceramic laminate 11 (step S11). Specifically, the conductive paste for external electrodes is applied to all end surfaces of the ceramic laminate 11, and is applied so as to extend from the end surfaces to principal surfaces and side surfaces.

After the conductive paste for external electrodes having been applied is dried (step S12), the conductive paste is sintered (step S13). This forms a base electrode layer of an external electrode.

After that, surface treatment using a barrel is applied to the ceramic laminate 11 (step S14), and then plating is applied to the ceramic laminate 11 to form a plating layer on the base electrode layer having been formed (step S15).

Through the steps described above, the multilayer ceramic capacitor 10, such as illustrated in FIGS. 1 to 3, is manufactured.

The present invention is not limited to the preferred embodiments described above, and various applications, modifications can be added within the scope of the present invention.

For example, while a multilayer ceramic capacitor is described as a multilayer ceramic electronic component, a multilayer ceramic electronic component is not limited to a multilayer ceramic capacitor, and may be an LC complex component, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a multilayer ceramic electronic component, the method comprising the steps of:
    preparing a laminate including a plurality of internal electrodes stacked with a ceramic green sheet therebetween, at least one of the internal electrodes being exposed on a surface of the laminate;
    heating a functional sheet while the functional sheet is in contact with a predetermined surface of the laminate, on which the at least one of the internal electrodes is exposed;
    cooling the heated functional sheet; and
    providing a covering layer formed of the functional sheet on the predetermined surface of the laminate by punching out the cooled functional sheet with the laminate.

2. The method for manufacturing a multilayer ceramic electronic component according to claim 1, wherein in the step of heating the functional sheet, the functional sheet is softened by heating a thermoplastic resin contained in the functional sheet.

3. The method for manufacturing a multilayer ceramic electronic component according to claim 1, wherein
    the functional sheet has a structure in which a plurality of sheets each including a thermoplastic resin is stacked; and
    a softening temperature of a resin included in a sheet disposed at a position closest to the laminate is a lowest among softening temperatures of resins included in the respective plurality of sheets defining the functional sheet.

4. The method for manufacturing a multilayer ceramic electronic component according to claim 1, wherein a softening temperature of a resin included in the ceramic green sheet is higher than a softening temperature of a resin included in the functional sheet.

5. The method for manufacturing a multilayer ceramic electronic component according to claim 1, further comprising the step of:
    bonding the covering layer formed on the laminate by using thermocompression bonding.

6. The method for manufacturing a multilayer ceramic electronic component according to claim 5, wherein a heating temperature during the thermocompression bonding is not less than 50° C. and not more than about 100° C., and a compression force during the thermocompression bonding provides a surface pressure per laminate not less than about 1 MPa and not more than about 15 MPa.

7. The method for manufacturing a multilayer ceramic electronic component according to claim 1, wherein the functional sheet is a ceramic green sheet.

8. The method for manufacturing a multilayer ceramic electronic component according to claim 1, wherein a heating temperature in the step of heating the functional sheet is about 50° C. or more and less than about 100° C.

9. The method for manufacturing a multilayer ceramic electronic component according to claim 1, wherein
the laminate has a structure in which a first internal electrode of the plurality of internal electrodes is extended to a first of a pair of end surfaces facing each other, and a second internal electrode of the plurality of internal electrodes is extended to a second of the pair of end surfaces, and in which the plurality of internal electrodes is exposed to both of a first side surface and a second side surface, facing each other; and
in the step of heating the functional sheet, the predetermined surface of the laminate, with which the functional sheet is brought into contact, is the first side surface and the second side surface.

10. The method for manufacturing a multilayer ceramic electronic component according to claim 1, wherein the multilayer ceramic electronic component is one of a capacitor and an LC complex component.

11. The method for manufacturing a multilayer ceramic electronic component according to claim 1, further comprising processing the laminate to form rounded corners and rounded ridge line portions.

12. The method for manufacturing a multilayer ceramic electronic component according to claim 1, further comprising providing another functional sheet on another predetermined surface of the laminate, on which another one of the internal electrodes is exposed to form a side-surface covered laminate in which side surfaces of the laminate are covered by the functional sheet and the another functional sheet.

13. The method for manufacturing a multilayer ceramic electronic component according to claim 1, wherein the functional sheet forms a traverse gap in the laminate.

14. The method for manufacturing a multilayer ceramic electronic component according to claim 1, wherein the functional sheet is larger than the predetermined surface of the laminate.

15. The method for manufacturing a multilayer ceramic electronic component according to claim 1, wherein the functional sheet includes a plurality of green sheets.

16. The method for manufacturing a multilayer ceramic electronic component according to claim 1, wherein
the functional sheet has a structure in which a plurality of green sheets is stacked; and
a thickness of one of the plurality of green sheets located farthest away from the laminate has a thickness larger than that of remaining ones of the plurality of green sheets.

17. The method for manufacturing a multilayer ceramic electronic component according to claim 1, wherein the cooling the functional sheet includes using one of an air cooling fan and a Peltier element, or using self-heat dissipation.

18. The method for manufacturing a multilayer ceramic electronic component according to claim 1, wherein the cooling the functional sheet includes performing cooling until the functional sheet reaches a temperature of about 30° C. or less.

19. The method for manufacturing a multilayer ceramic electronic component according to claim 1, further comprising removing a plastic film from the functional sheet before performing the cooling the functional sheet.

* * * * *